Patented Sept. 11, 1934

1,973,084

UNITED STATES PATENT OFFICE 1,973,084

FOOD PRODUCT AND PROCESS OF MAKING

George Thomas Lewis, Jacksonville, Fla., assignor to Citrus Pulp Corporation, Jacksonville, Fla.

No Drawing. Application May 23, 1932, Serial No. 613,130

3 Claims. (Cl. 99—11)

The invention relates to foods and the process of making the same and has for its object to provide a food product particularly adapted for feeding cattle and formed from the skins, rag and seed of citrus fruit, particularly grapefruit, which skins are at the present time destroyed or used as a fertilizer.

A further object is to provide a food product formed from citrus fruit skins, rag and seed, from which moisture and oil has been expelled, thereby leaving a fibrous material, which when dry, may be used for feeding cattle, and which will not decompose.

A further object is to form a food product from citrus fruit skins, rag and seed, particularly grapefruit by severing the skins and simultaneously compressing the same for breaking up the hydroscopic cells, thereby allowing the moisture and oils to be squeezed from the material and preventing deterioration or decomposition of the material incident to the oils and moisture, and finally subjecting the shredded and pressed material to the action of heat for a drying operation.

A further object is to form a food product for cattle or other animals from citrus fruit skins, rag and seed by first subjecting the same to a shredding operation and a chushing operation, thereby expelling oil and moisture from the by-product and finally drying the product so formed.

It is the present practice in canneries to destroy or dispose of citrus peeling, particularly grapefruit by burying the same as it rapidly decomposes on account of the oils and moisture therein; or it is placed on land as humis. It has been found that peel of this character has considerable food value, particularly for animals, and it may be packed, stored and shipped without danger of deterioration, if properly treated by the following method.

The citrus peel, rag and seed is first subjected to a simultaneous crushing and shredding operation, which will reduce the same to relatively small pieces so that the crushing operation, which preferably is a simultaneous one with the shredding, will break down the cells of the skin and at the same time will expel or express the oil and moisture from the material so treated. The oils may be used as a further by-product if so desired. After the shredding and crushing operation the material so treated is subjected to a drying operation, which will further remove the moisture or oils from the material which may remain therein. It has been found that the material so formed makes an excellent product for food purposes for cattle and other animals, and the material will keep indefinitely. If so desired, the food may be added to other foods for cattle feeding purposes.

Although the shredding and crushing operation is preferably a simultaneous one, it is obvious that they may be separate operations. The product can be made from any kind of citrus peel, however it is preferably made from grapefruit.

The invention having been set forth what is claimed as new and useful is:—

1. A method of forming a dry bulky succulent stock food from moist grapefruit peel having oil cells with oil therein, grapefruit rag and grapefruit seed comprising first subjecting the peel, rag and seed in moist condition to a simultaneously combined shredding and pressing operation for breaking down the cells and simultaneously expressing oil and moisture from the grapefruit peel cells, rag and seed and finally subjecting the said shredded and pressed material to a heat drying operation.

2. The method of forming a bulky succulent stock food from citrus peel having a cell structure with oil and moisture therein, said method comprising subjecting the peel to a combined simultaneous shredding and crushing operation to break down and express the oil and moisture from the cells thereof and finally subjecting the material so obtained to a drying operation.

3. The method of forming a bulky succulent stock food from grapefruit peel having a cell structure with oil and moisture therein, said method comprising subjecting the peel to a simultaneous shredding and crushing operation to break down the cells and express the oil and moisture therefrom and finally subjecting the material so obtained to a drying operation.

GEORGE THOMAS LEWIS.